(12) United States Patent
Meng et al.

(10) Patent No.: US 11,487,057 B2
(45) Date of Patent: Nov. 1, 2022

(54) OPTICAL SUBSTRATE AND DISPLAY DEVICE

(71) Applicant: BOE TECHNOLOGY GROUP CO., LTD., Beijing (CN)

(72) Inventors: Xiandong Meng, Beijing (CN); Wei Wang, Beijing (CN); Xianqin Meng, Beijing (CN); Jifeng Tan, Beijing (CN); Xiaochuan Chen, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 220 days.

(21) Appl. No.: 16/765,152

(22) PCT Filed: Oct. 31, 2019

(86) PCT No.: PCT/CN2019/114645
§ 371 (c)(1),
(2) Date: May 18, 2020

(87) PCT Pub. No.: WO2020/088576
PCT Pub. Date: May 7, 2020

(65) Prior Publication Data
US 2020/0348461 A1 Nov. 5, 2020

(30) Foreign Application Priority Data
Oct. 31, 2018 (CN) .......................... 201811287289.4

(51) Int. Cl.
*F21V 8/00* (2006.01)
*G02F 1/1335* (2006.01)
*G02F 1/1343* (2006.01)

(52) U.S. Cl.
CPC ............. *G02B 6/005* (2013.01); *G02B 6/003* (2013.01); *G02B 6/0068* (2013.01);
(Continued)

(58) Field of Classification Search
CPC ......... G02F 1/133512; G02F 1/134309; G02F 1/133615; G02F 1/133621; G02B 6/005; G02B 6/003; G02B 6/0068; G02B 6/0073
(Continued)

(56) References Cited

U.S. PATENT DOCUMENTS

2005/0254258 A1    11/2005 Lee
2010/0207964 A1*    8/2010 Kimmel ............ G02F 1/133615
                                                       313/111
(Continued)

FOREIGN PATENT DOCUMENTS

CN    104089221 A    10/2014
CN    103235356 B     6/2016
(Continued)

OTHER PUBLICATIONS

ISA China National Intellectual Property Administration, International Search Report Issued in Application No. PCT/CN2019/114645, dated Feb. 1, 2020, WIPO, 18 pages.

*Primary Examiner* — Edward J Glick
*Assistant Examiner* — David Y Chung
(74) *Attorney, Agent, or Firm* — McCoy Russell LLP

(57) ABSTRACT

An optical substrate and a display device are provided. The optical substrate includes a light guide plate and a plurality of light selection units, wherein, the light guide plate includes a light-incident surface and a light-exiting surface, and the light-exiting surface includes a plurality of light-exiting regions; each light selection unit is configured to select light incident from the light-incident surface and propagating in the light guide plate, such that monochromatic light of different colors are emitted from multiple light-exiting regions corresponding to the each light selection unit, and each of the multiple light-exiting regions emits monochromatic light of a single color.

19 Claims, 6 Drawing Sheets

(52) U.S. Cl.
CPC ..... *G02B 6/0073* (2013.01); *G02F 1/133512* (2013.01); *G02F 1/134309* (2013.01)

(58) Field of Classification Search
USPC .......................................................... 349/65
See application file for complete search history.

(56) References Cited

U.S. PATENT DOCUMENTS

| | | |
|---|---|---|
| 2015/0219958 A1 | 8/2015 | Zhang et al. |
| 2017/0315431 A1* | 11/2017 | Schnarrenberger ......................... G02B 27/1006 |
| 2017/0322359 A1* | 11/2017 | Park .................. G02F 1/133615 |

FOREIGN PATENT DOCUMENTS

| | | | | |
|---|---|---|---|---|
| CN | 107621731 A | | 1/2018 | |
| CN | 207123688 U | * | 3/2018 | |
| CN | 207123688 U | | 3/2018 | |
| CN | 108710240 A | * | 10/2018 | ............ G02B 6/005 |
| CN | 108710240 A | | 10/2018 | |
| CN | 109188775 A | | 1/2019 | |

* cited by examiner

OPTICAL SUBSTRATE AND DISPLAY DEVICE

CROSS-REFERENCE TO RELATED APPLICATIONS

The present application is the U.S. national phase of International Application No. PCT/CN2019/114645 filed on Oct. 31, 2019, which claims priority to Chinese Patent Application No. 201811287289.4 filed on Oct. 31, 2018. The entire contents of each of the above-listed applications are hereby incorporated by reference for all purposes.

TECHNICAL FIELD

The present disclosure relates to the field of display technology, and in particular, relates to an optical substrate and a display device.

BACKGROUND

In a related display device, monochromatic light emitted from a Light-Emitting Diode (LED) light source is coupled into a light guide plate; an extraction grating is on or under the light guide plate since total reflection transmission occurs within the light guide plate; the extracting grating extracts, at a collimation angle, the monochromatic light propagating in a total reflection manner in the light guide plate. The extracted monochromatic light passes through a color film structure to form a color display device.

SUMMARY

An optical substrate and a display device are provided in the present disclosure.

In a first aspect, an optical substrate is provided in the present disclosure. The optical substrate includes a light guide plate and a plurality of light selection units, wherein, the light guide plate includes a light-incident surface and a light-exiting surface, and the light-exiting surface includes a plurality of light-exiting regions; each light selection unit of the plurality of light selection unit is configured to select light incident from the light-incident surface and propagating in the light guide plate, such that monochromatic light of different colors are emitted from multiple light-exiting regions corresponding to the each light selection unit, and each of the multiple light-exiting regions emits monochromatic light of a single color.

Optionally, the each light selection unit includes multiple light-filtering films, the multiple light-filtering films correspond in a one-to-one manner to the multiple light-exiting regions corresponding to the each light selection unit, and each of the multiple light-filtering films is configured to reflect monochromatic light of a preset color among monochromatic light of the different colors to exit from the light-exiting surface and is configured to transmit monochromatic light of a color other than the preset color among monochromatic light of the different colors.

Optionally, the plurality of light-filtering films includes a first light-filtering film, a second light-filtering film, and a third light-filtering film; the first light-filtering film, the second light-filtering film and the third light-filtering film are arranged in the light guide plate at equal intervals with respect to the light-exiting surface; an included angle between the first light-filtering film and the light-exiting surface, an included angle between the second light-filtering film and the light-exiting surface, and an included angle between the third light-filtering film and the light-exiting surface are a first angle, a second angle and a third angle, respectively.

Optionally, the first light-filtering film, the second light-filtering film, and the third light-filtering film are arranged in parallel; the first angle, the second angle, and the third angle are 45 degrees.

Optionally, each of the plurality of light-filtering films is formed by periodically and alternately laminating dielectric layers of at least two different refractive indices.

Optionally, an arrangement period d of the dielectric layers of at least two different refractive indices forming the light-filtering film satisfies a following formula: $d=\lambda/2*n*\sin(\pi/2-\theta)$, where, $\lambda$ is a wavelength of monochromatic light reflected by the light-filtering film, n is an average refractive index of dielectric layers of at least two different refractive indices forming the light-filtering film, and $\theta$ is an included angle between an incident light ray incident onto the light-filtering film and a normal line of the light-filtering film.

Optionally, the dielectric layers of at least two different refractive indices include a high-refractive-index dielectric layer and a low-refractive-index dielectric layer, wherein a refractive index of the high-refractive-index dielectric layer is 1.51, and a refractive index of the low-refractive-index dielectric layer is 1.49.

Optionally, the plurality of light selection units includes a plurality of light-splitting gratings, the plurality of light-splitting gratings correspond in one-to-one manner to the plurality of light-exiting regions, and each of the plurality of light-splitting gratings is on a propagation path of light incident from the light-incident surface and is configured to cause monochromatic light of a preset color in light incident onto the light-splitting grating to exit toward the light-exiting surface.

Optionally, the light guide plate includes a bottom surface opposite to the light-exiting surface, the plurality of light-splitting gratings includes a plurality of transmissive gratings on the light-exiting surface and a plurality of reflective gratings on the bottom surface, each transmissive grating of the plurality of transmissive gratings is disposed corresponding to a light-exiting region of the plurality of light-exiting regions, each reflective grating of the plurality of reflective gratings is disposed corresponding to a light-exiting region of the plurality of light-exiting regions, and the plurality of transmissive gratings and the plurality of reflective gratings are arranged alternately; light incident onto a transmissive grating of the plurality of transmissive grating is split by the transmissive grating to generate a first transmitted light beam exiting from the light-exiting surface in a direction perpendicular to the light-exiting surface and a first reflected light beam reflected onto a reflective grating of the plurality of reflective grating; the first reflected light beam incident onto the reflective grating is split by the reflective grating to generate a second reflected light beam exiting from the light-exiting surface in a direction perpendicular to the light-exiting surface and a third reflected light beam reflected onto a next adjacent transmissive grating.

Optionally, a first planarization layer covering the plurality of the transmissive gratings is arranged on a light-exiting surface of the light guide plate; a second planarization layer covering the plurality of reflective gratings is arranged on the bottom surface of the light guide plate.

Optionally, the plurality of light-splitting gratings includes a first light-splitting grating, a second light-splitting grating and a third light-splitting grating; a period P of each grating of the first light-splitting grating, the second light-splitting grating, and the third light-splitting grating is obtained according to a following formula: $n_1 \sin\theta_1 - n_2 \sin\theta_2 = m\lambda/P$, where $n_1$ is a refractive index of a medium in which an incident light beam is located, $n_2$ is a refractive index of a medium in which a diffracted light beam is located, $\theta_1$ is an incident angle of a beam, $\theta_2$ is a diffraction angle of a beam, $\lambda$ is a wavelength of light to be selected, m is diffraction order of light.

Optionally, the optical substrate further includes: a light-emitting unit at the light-incident surface of the light guide plate, configured to emit a collimated light beam and cause the collimated light beam to be incident into the light guide plate from the light-incident surface of the light guide plate at a preset angle.

Optionally, the light-emitting unit includes: a light source on a side of the light-incident surface of the light guide plate, configured to emit white light or three-color-mixed light; a collimating lens structure configured to collimate the light emitted from the light source so as to form a collimated light beam incident into the light guide plate at the preset angle; and a beam-reduction structure configured to narrow a width of the collimated light beam emitted from the collimating lens structure.

Optionally, the beam-reduction structure including a light-shielding member arranged on the light-incident surface of the light guide plate, and an opening having a preset area is arranged on the light-shielding member, so that a width of a light beam incident into the light guide plate is less than or equal to a width of a corresponding light-exiting region of the plurality of light-exiting regions.

Optionally, the beam-reduction structure includes two lenses having different focal lengths, and main optical axes of the two lenses coincide; the two lenses include a first convex lens and a second convex lens arranged in a propagation direction of a light beam emitted from the light-emitting unit; a focal point of the first convex lens on a side, closer to the second convex lens, of the first convex lens coincides with a focal point of the second convex lens on a side, closer to the first convex lens, of the second convex lens at a first position; a focal length of the first convex lens is larger than a focal length of the second convex lens; and a first collimated light beam emitted from the collimating lens structure enters the first convex lens in a direction parallel to the main optical axis of the first convex lens and passes through the first position after being refracted by the first convex lens, the light beam passing through the first position is refracted by the second convex lens to generate a second collimated light beam propagating in a direction parallel to the main optical axis of the second convex lens; and a width of the second collimated light beam is smaller than a width of the first collimated light beam. Optionally, the two lenses include a third convex lens and a first concave lens concave at both sides of the first concave lens; the third convex lens and the first concave lens are arranged along a propagation direction of a light beam emitted from the light-emitting unit; a focus of the third convex lens on a side of the third convex lens near the first concave lens and a focus of the first concave lens on a side of the first concave lens away from the third convex lens coincide at a second position; a focal length of the third convex lens is larger than a focal length of the first concave lens, and a first collimated-light beam emitted from the collimating lens structure enters the third convex lens in a direction parallel to a main optical axis of the third convex lens, and then propagates to the first concave lens after being refracted by the third convex lens, and then forms a second collimated-light beam propagating in a direction parallel to a main optical axis of the first concave lens after being refracted by the first concave lens, wherein a width of the second collimated-light beam is smaller than a width of the first collimated-light beam.

Optionally, the light-emitting unit includes a light source, the light source includes at least two light sub-sources spaced from one another, each of the at least two light sub-sources emits monochromatic light of a preset color, the at least two light sub-sources are spaced from one another along a first direction on a side of the light-incident surface of the light guide plate such that monochromatic light rays emitted by each of the at least two light sub-sources are incident into the light guide plate at a preset angle in parallel and propagate within the light guide plate in a non-total reflection manner, the first direction is a direction from the light-exiting surface of the light guide plate to a bottom surface of the light guide plate opposite to the light-exiting surface.

Optionally, the at least two light sub-sources include a first collimating light sub-source, a second collimating light sub-source, and a third collimating light sub-source; the first collimating light sub-source, the second collimating light sub-source, and the third collimating light sub-source are configured to emit first collimated light, second collimated light and third collimated light, respectively, and the first collimated light, the second collimated light and the third collimated light are incident into the light guide plate in parallel at a second preset angle and propagate in the light guide plate in a non-total reflection manner.

Optionally, widths of monochromatic light beams emitted by the at least two light sub-sources are smaller than a preset width, such that the monochromatic light beams emitted by the at least two light sub-sources do not overlap in propagation paths of the monochromatic light beams.

In a second aspect, a display device is provided in the present disclosure. The display device includes the optical substrate and an opposing substrate opposite to the optical substrate.

Optionally, the display device further includes: a liquid crystal layer between the light guide plate and the opposite substrate; a light shielding layer between the opposite substrate and the liquid crystal layer, wherein the light shielding layer includes a plurality of opening regions, an orthographic projection of each of the plurality of opening regions on the optical substrate is between any two adjacent light-exiting regions among the plurality of light-exiting regions; an electrode for supplying an electric field to the liquid crystal layer, wherein the electrode is provided on a side, where the light-exiting surface is, of the light guide plate, and is configured for adjusting a rotation angle of liquid crystal, so as to adjust a propagation direction of monochromatic light incident on the liquid crystal layer.

Optionally, the light shielding layer includes a plurality of light shielding regions and a plurality of opening regions arranged alternately.

DETAILED DESCRIPTION

In order to make objectives, technical solutions and advantages of the embodiments of the present disclosure more apparent, the technical solutions of the embodiments of the present disclosure will be clearly and completely described below in conjunction with the drawings of the embodiments of the present disclosure. It will be apparent that the described embodiments are part, rather than all, of the embodiments of the present disclosure. Based on the described embodiments of the present disclosure, all other embodiments obtained by those of ordinary skill in the art are within the scope of the present disclosure.

Figure 1:
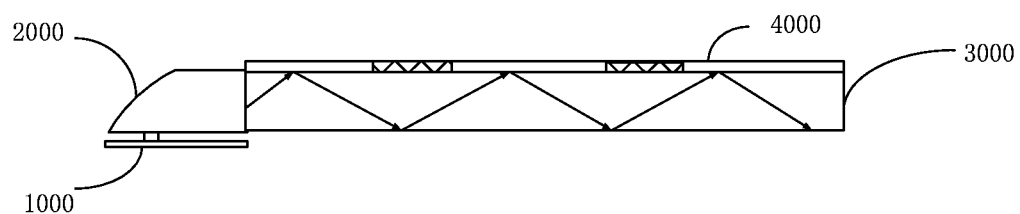
FIG. 1 is a schematic structural diagram of a display device in relevant art.

FIG. 1 is a schematic structural diagram of a related display device. As shown in FIG. 1, lambertian monochromatic light emitted from a Light-Emitting Diode (LED) light source 1000 is modulated by a free-form surface reflective mirror 2000, coupled into a light guide plate 3000 at a center of the light guide plate 300 at a certain angle, and transmitted in the light guide plate 3000 in a total reflection manner. An extraction grating 4000 is provided on a light-exiting surface or a bottom surface (the other surface opposite to the light-exiting surface) of the light guide plate 3000. A function of the extraction grating 4000 is to extract, at a collimation angle, large-angle monochromatic light transmitted in the total reflection manner in the light guide plate 3000, thereby realizing a collimated light source with a high transmittance (most of background light can pass through).

However, a structure of the above display device has following problems: the extraction grating 4000 can only extract light of a single color at the collimation angle, an LED light source can only be a monochromatic light source, and a color film structure needs to be provided above the extraction grating to realize color display, hence a light-loss rate is high.

To address this problem, the present disclosure provides an optical substrate, as shown in FIGS. 2-5 and FIG. 8, the optical substrate 1 of some embodiments of the present disclosure includes a light guide plate 10 and a plurality of light selection units 90 arranged in a periodic manner.

The light guide plate 10 includes a light-incident surface 101 and a light-exiting surface 102 adjacent to the light-incident surface 101. The light-exiting surface 102 includes a plurality of light-exiting regions arranged in an array or in a matrix. The light guide plate 10 may be a side-in type light guide plate, and the light-incident surface 101 may be located on a side surface of the side-in type light guide plate and is a side surface perpendicular to the light-exiting surface. There may be a common boundary between the light-incident surface 101 and the light-exiting surface 102, and the light-incident surface 101 and the light-exiting surface 102 are perpendicular to each other.

A plurality of pixel units are arranged in one-to-one correspondence with the plurality of light selection units 90. A periodic distribution of the plurality of pixel units is the same as a periodic distribution of the plurality of light selection units. Each of the plurality of pixel units includes one or more sub-pixel units of different colors.

Each of the plurality of light selection units 90 is configured to select light incident at the light-incident surface 101 and transmitted in the light guide plate 10, so that monochromatic light having the same color as that of one or more sub-pixel units among the pixel unit corresponding to the light selection unit is emitted from the one or more sub-pixel units having the color. That is, light rays selected by different light selection sub-units in the light selection unit are respectively projected to positions of the one or more sub-pixel units in the pixel unit corresponding to the light selection unit, thereby forming one or more light-exiting regions on the light-exiting surface 102, and each light-exiting region emits monochromatic light having one color.

In some embodiments of the present disclosure, in a case that the one or more sub-pixel units having different colors are sub-pixel units of three colors, the one or more light-exiting regions include three light-exiting regions emitting light of three colors, i.e., a first light-exiting region E1 configured to enable monochromatic light of a first preset color to exit from the first light-exiting region E1; a second light-exiting region E2 configured to enable monochromatic light of a second preset color to exit from the second light-exiting region E2; a third light-exiting region E3 configured to enable monochromatic light of a third preset color to exit from the third light-exiting region E3.

For example, the plurality of sub-pixel units includes a first sub-pixel unit, a second sub-pixel unit, and a third sub-pixel unit, and the three sub-pixel units correspond to three colors, respectively. The light-exiting regions include the first light-exiting region E1, the second light-exiting region E2, and the third light-exiting region E3 corresponding to a plurality of sub-pixel units, respectively. Each light selection unit 90 is configured to select light in a first wavelength range (i.e., the monochromatic light of the first preset color is the light in the first wavelength range) from light transmitted within the light guide plate 10 and enable the light in the first wavelength range to exit from the first light-exiting region E1; select light in a second wavelength range (i.e., the monochromatic light of the second preset color is the light in the second wavelength range) from the light transmitted within the light guide plate 10 and enable the light in the second wavelength range to exit from the second light-exiting region E2; and select light in a third wavelength range (i.e., the monochromatic light of the third preset color is the light in the third wavelength range) from the light transmitted within the light guide plate 10 and enable the light in the third wavelength range to exit from the third light-exiting region E3, wherein a color of the light in the first wavelength range is the same as a color of a first sub-pixel unit corresponding to the first light-exiting region E1, a color of the light in the second wavelength range is the same as a color of a second sub-pixel unit corresponding to the second light-exiting region, and a color of the light in the third wavelength range is the same as a color of a third sub-pixel unit corresponding to the third light-exiting region.

Optionally, in a case that colors of the first sub-pixel unit, the second sub-pixel unit, and the third sub-pixel unit are the red (R) color, the green (G) color, and the blue (B) color, the light selection unit 90 is configured to select the red light (R) from the light transmitted within the light guide plate 10 and enable the red light to exit from the first light-exiting region E1; select the green light (G) from the light transmitted within the light guide plate 10 and enable the green light to exit from the second light-exiting region E2; and select the blue light (B) from the light transmitted within the light guide plate 10 and enable the blue light to exit from the third light-exiting region E3. Accordingly, the optical substrate provided by the embodiments of the present disclosure realizes a color backlight effect, and the display device can realize color display without providing a polarizer (POL) and a color film structure, and has certain advantages in transparent display and a high light utilization efficiency, and enable further promotion in mass production in future.

There may be various specific structural forms of the light selection unit. Specific examples thereof are described hereinafter, respectively.

In an example, each light selection unit corresponding to a pixel unit is disposed within the light guide plate, and each light selection unit includes one or more light-filtering films corresponding to one or more sub-pixel units of different colors within the pixel unit in a one-to-one manner.

In some embodiments, each of the light-filtering films is used to reflect monochromatic light of a preset color in light incident at the light-incident surface and transmit light other than the light of the preset color in the light incident at the light-incident surface, wherein each of the light-filtering films is disposed in the light guide plate obliquely with respect to the light-exiting surface, an angle between the light-filtering film and the light-exiting surface is a first included angle. Specifically, a surface of the light-filtering film having a reflection function, i.e., a reflective surface, faces towards the light-exiting surface of the light guide plate, the first included angle is an included angle between the reflective surface of the light-filtering film and the light-exiting surface of the light guide plate, specifically, is an angle between 0 degree and 90 degrees, and other than the 0 degree and the 90 degrees.

The monochromatic light reflected by the light-filtering film is caused to exit from a corresponding light-exiting region in a direction perpendicular to the light-exiting surface. The first included angle may be between 40 degrees and 50 degrees, optionally may be 45 degrees.

Illustratively, the plurality of the light-filtering films are arranged in one-to-one correspondence with the plurality of sub-pixel units, to form the first light-exiting region E1, the second light-exiting region E2, and the third light-exiting region E3. The light selection unit including a first light-filtering film 100, a second light-filtering film 200 and a third light-filtering film 300. Optionally, the first light-filtering film 100, the second light-filtering film 200, and the third light-filtering film 300 are disposed in parallel.

The first light-filtering film 100 is configured to reflect the light in the first wavelength range and transmit light in a range other than the first wavelength range. The first light-filtering film 100 is disposed obliquely in the light guide plate 10. An angle between the first light-filtering film 100 and a light beam emitted from the light-emitting unit is the first included angle such that light after being reflected by the first light-filtering film 100 is in a direction perpendicular to the light-exiting surface of the light guide plate 1, and exits from the first light-exiting region E1.

The second light-filtering film 200 is configured to reflect light in the second wavelength range and transmit light in a range other than the second wavelength range. The second light-filtering film 200 is disposed obliquely in the light guide plate 10. An angle between the second light-filtering film 200 and a light beam emitted from the light-emitting unit is a second included angle such that light after being reflected by the second light-filtering film 200 is in a direction perpendicular to the light-exiting surface of the light guide plate 10, and exit from the second light-exiting region E2.

The third light-filtering film 300 is configured to reflect light in the third wavelength range and transmit light in a range other than the third wavelength range. The third light-filtering film 300 is disposed obliquely in the light guide plate 10. An angle between the third light-filtering film 300 and a light beam emitted from the light-emitting unit is a third included angle such that light after being reflected by the third light-filtering film 300 is in a direction perpendicular to the light-exiting surface of the light guide plate 10, and exit from the third light-exiting region E3.

Degrees of the first included angle, the second included angle, the third included angle may be the same and may be different, and specific arrangement of the first included angle, the second included angle, and the third included angle is determined by structural characteristics of the first light-filtering film 100, the second light-filtering film 200 and the third light-filtering film 300, so long as the monochromatic light after being reflected by the light-filtering film exits from a corresponding light-exiting region in a direction perpendicular to the light-exiting surface.

The first light-filtering film 100, the second light-filtering film 200, and the third light-filtering film 300 correspond to a plurality of sub-pixel units of a pixel unit, respectively, for example, three sub-pixel units; and the first light-filtering film 100, the second light-filtering film 200, and the third light-filtering film 300 extract light of the same colors as those of sub-pixel units corresponding to the first light-filtering film 100, the second light-filtering film 200, and the third light-filtering film 300, respectively. Such film structures as the first light-filtering film 100, the second light-filtering film 200 and the third light-filtering film 300 in the embodiment of the present disclosure have wavelength selectivity and angular deflection characteristics. That is, the film structure can modulate and extract light of only a preset color (or a preset wavelength), and by reasonably designing an inclination angle of the film structure with respect to incident light, a specific deflection angle of light of a specific wavelength can be realized, light of a color other than the preset color is not changed when passing through the film structure, and continues to pass through other film structures until being modulated and extracted by a film structure corresponding to the color, and there is no loss of light energy in such a process.

For example, in a case that sub-pixel units of three colors R, G, and B are included in a pixel unit, the first light-filtering film 100 is disposed to correspond to an R sub-pixel unit, the second light-filtering film 200 is disposed to correspond to a G sub-pixel unit, and the third light-filtering film 300 is disposed to correspond to a B sub-pixel unit.

Figure 11:
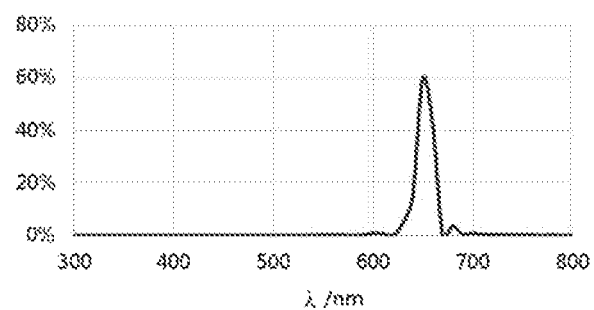
FIG. 11 is a schematic diagram showing a light output spectrum of a first light-filtering film in some embodiments of the present disclosure.

The first light-filtering film 100 is configured to reflect light of the same color as that of the R sub-pixel unit (i.e., red light) and transmit light in a range (i.e., green light and blue light are not changed after passing through the first light-filtering film 100) other than the first wavelength range, and the red light after being reflected by the first light-filtering film 100 exits from the first light-exiting region E1 in a direction perpendicular to the light-exiting surface of the light guide plate 10, and FIG. 11 shows a schematic diagram of light spectrum of the red light reflected by the first light-filtering film.

Figure 12:
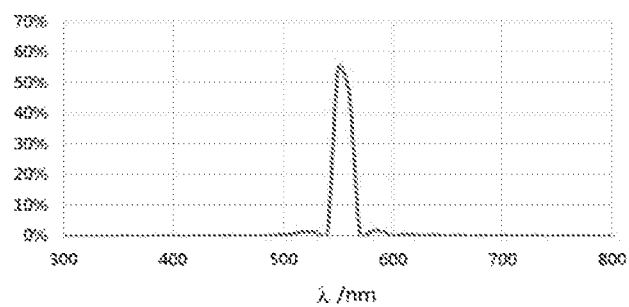
FIG. 12 is a schematic diagram showing a light output spectrum of a second light-filtering film in some embodiments of the present disclosure.

The second light-filtering film 200 is configured to reflect light of the same color as that of the G sub-pixel unit (i.e., the green light) and transmit light in a range (i.e., the red light and the blue light are not changed after passing through the second light-filtering film 200) other than the second wavelength range, and the green light after being reflected by the second light-filtering film 200 exits from the second light-exiting region E2 in a direction perpendicular to the light-exiting surface of the light guide plate 10, and FIG. 12 shows a schematic diagram of light spectrum of the green light reflected by the second light-filtering film.

Figure 13:
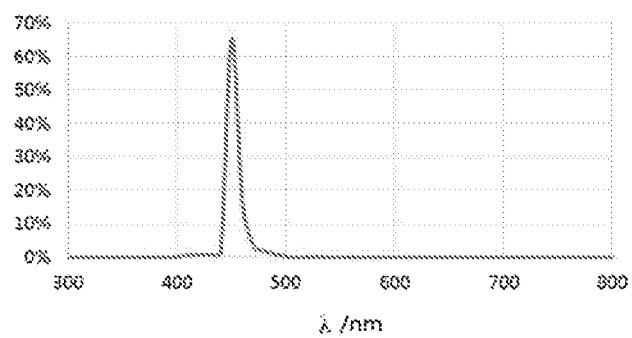
FIG. 13 is a schematic diagram showing a light output spectrum of a third light-filtering film in some embodiments of the present disclosure.

The third light-filtering film 300 is configured to reflect light of the same color as that of the B sub-pixel unit (i.e., the blue light) and transmit light in a range (i.e., the green light and the red light are not changed after passing through the third light-filtering film 300) other than the third wavelength range, and the blue light after being reflected by the third light-filtering film 300 exits from the third light-exiting region E3 in a direction perpendicular to the light-exiting surface of the light guide plate 10, and FIG. 13 shows a schematic diagram of light spectrum of the blue light reflected by the third light-filtering film.

In the embodiments of the present disclosure, light having the same color as that of a corresponding sub-pixel unit is selected by structures and arrangements of the light-filtering films, and there is no stray interference light compared with arrangement of a micro-nano structure of a grating, and problems such as crosstalk (the micro-nano structure is sensitive to a wavelength, and a micro-nano grating makes light in all bands be diffracted) are not generated.

In the embodiments of the present disclosure, a light beam emitted by the light-emitting unit is incident onto the light guide plate 10 parallel to the light-exiting surface of the light guide plate 10, and the first included angle is an inclination angle of a corresponding filter film, and the light beam incident onto the light guide plate 10 at the light-incident surface of the light guide plate 10 propagates along a propagation path in the light guide plate 10 parallel to the light-exiting surface 102 of the light guide plate 10.

Figure 10:
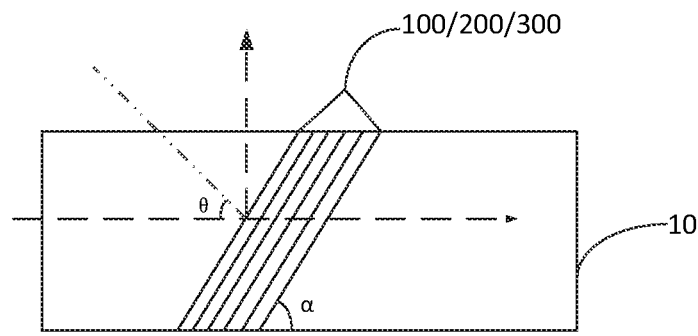
FIG. 10 is a schematic diagram showing a principle of configuration of an light-filtering film in some embodiments of the present disclosure.

In some embodiments of the present disclosure, light of a wavelength reflected by a corresponding one of the first light-filtering film 100, the second light-filtering film 200, and the third light-filtering film 300 is collimated and emitted upwards. According to a Bragg effect, a ray of the selected light and an initial incident light ray have a symmetrical relationship with respect to a perpendicular line (a normal line) of the corresponding light-filtering film. Thus, the inclination angle of 0the first light-filtering film 100, or the second light-filtering film 200, or the third light-filtering film 300 in the light guide plate 10 is α=45 degrees, and FIG. 10 shows a schematic diagram of arrangement of the first light-filtering film 100 or the second light-filtering film 200 or the third light-filtering film 300 in the light guide plate 10.

In the embodiments of the present disclosure, the light-filtering film is designed in accordance with the Bragg principle, and each of the light-filtering films is formed by periodically and alternately laminating dielectric layers of at least two different refractive indices.

Figure 9:
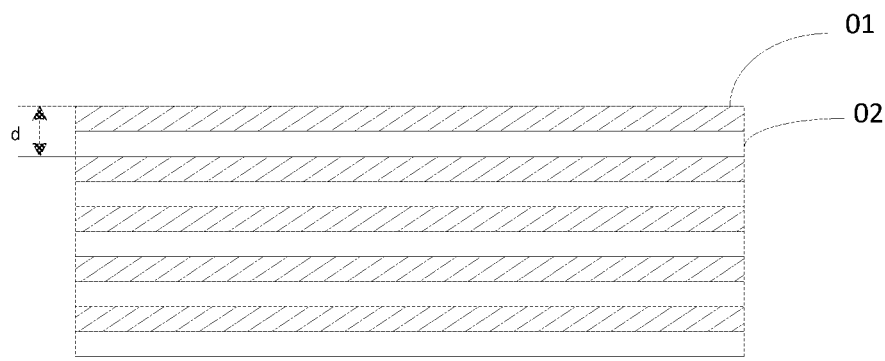
FIG. 9 is a schematic structural diagram of an light-filtering film in some embodiments of the present disclosure.

Optionally, each of the light-filtering films includes a high-refractive-index dielectric layer 01 and a low-refractive-index dielectric layer 02 alternately stacked and having the same thickness, as shown in FIG. 9.

A refractive index of the low-refractive-index dielectric layer 01 is in a range of 1.0-1.8, and a refractive index of the high-refractive-index dielectric layer 02 is in a range of 1.2-2.0, but the present disclosure is not limited thereto.

In some embodiments of the present disclosure, a period of arrangement the dielectric layers in the light-filtering film is the sum of the thickness of a high-refractive-index dielectric layer and the thickness of a low-refractive-index dielectric layer. The thickness of the high-refractive-index dielectric layer and the thickness of the low-refractive-index dielectric layer are determined by a wavelength and a deflection angle of light to be selected by the light-filtering film.

As shown in FIGS. 9 and 10, in the embodiments of the present disclosure, the period d of arrangement of the dielectric layers in each of the light-filtering films satisfies the following formula (1): $d=\lambda/2*n*\sin(\pi/2-\theta)$, wherein, $\lambda$ is the wavelength of monochromatic light reflected by the light-filtering film, n is an average refractive index of at least two dielectric layers having different refractive indices of the light-filtering film, and $\theta$ is an included angle between the incident light incident onto the light-filtering film and the normal line extending across the light-filtering film.

The thickness of each of the light-filtering films is the sum of thicknesses of 40-100 dielectric layers.

Specific refractive index difference between the high-refractive-index dielectric layer and the low-refractive-index dielectric layer will determine a wavelength-selection modulation efficiency of a corresponding light-filtering film. In practical application, a material of the high-refractive-index dielectric layer and a material of the low-refractive-index dielectric layer can be reasonably selected according to the principle of backlight uniformity, to control a gradient change of the refractive index difference and realize the backlight uniformity.

In a case that the plurality of the light-filtering films include the first light-filtering film 100, the second light-filtering film 200, and the third light-filtering film 300 corresponding to sub-pixel units having three colors, it is configured that wavelengths of light reflected by the first light-filtering film 100, the second light-filtering film 200 or the third light-filtering film 300 are 650 nm (R), 550 nm (G), and 450 nm (B), respectively, the refractive index of the high-refractive-index dielectric layer is 1.51, the refractive index of the low-refractive-index dielectric layer is 1.49, and the average refractive index n=1.5. Each of the first light-filtering film 100, the second light-filtering film 200, and the third light-filtering film 300 includes a total of 80 dielectric layers.

If considering the above formula (1), periods of the light-filtering films corresponding to the three wavelengths (i.e., the period of arrangement of the dielectric layers in each light-filtering film) and the thicknesses of the light-filtering films can be derived:

If the period of the first light-filtering film 100 is denoted as d_R, the period of the second light-filtering film 200 is denoted as d_G, and the period of the third light-filtering film 300 is denoted as d_B, then:

$$d\_R=\lambda\_R/2*n*\sin(\pi/2-\theta)=0.65/(2*1.5*0.707)=0.212 \text{ um};$$

$$d\_G=\lambda\_G/2*n*\sin(\pi/2-\theta)=0.55/(2*1.5*0.707)=0.259 \text{ um};$$

$d\_B=\lambda\_R/2*n*\sin(\pi/2-\theta)=0.45/(2*1.5*0.707)=0.306$ um;

As can be seen from FIGS. 11-13, when white light is incident onto the light-filtering films (the first light-filtering film 100, the second light-filtering film 200, and the third light-filtering film 300), accurate selection of light having a corresponding wavelength can be achieved. That is, the optical substrate in the embodiments of the present disclosure can realize a colored lattice backlight with substantially no loss of light energy. The materials of dielectric layers of each of the first light-filtering film 100, the second light-filtering film 200, and the third light-filtering film 300 are transparent materials, and the entirety of the display device has an extremely high transparency.

In the above technical solution of the optical substrate, a color backlight effect is realized by using the light-filtering films. In addition to usage of the light-filtering films, other structures can also be adopted to screen light rays of different colors, thereby realizing the color backlight effect, and a specific structure of the optical substrate using a light-splitting grating to realize the color backlight effect is described in detail below.

In another example, each light selection unit includes a plurality of light-splitting gratings corresponding to the light-exiting regions. Each of the light-splitting gratings is arranged in a propagation path of light incident onto the light-incident surface, and configured to enable monochromatic light of a preset color in the light incident onto the light-splitting grating to exit in a collimated manner in a direction perpendicular to the light-exiting surface of the light guide plate.

The light guide plate includes a bottom surface opposite to the light-exiting surface, and the plurality of light-splitting gratings include a plurality of transmissive gratings on the light-exiting surface and a plurality of reflective gratings on the bottom surface. Each of the transmissive gratings and the reflective gratings is arranged to correspond to a light-exiting region, and the plurality of transmissive gratings and the plurality of reflective gratings are arranged alternately. Light incident onto a transmissive grating is split by the transmissive grating to generate a first transmitted light beam exiting from the light-exiting surface in a direction perpendicular to the light-exiting surface and a first reflected light beam reflected onto a reflective grating. The first reflected light beam incident onto the reflective grating is split by the reflective grating to generate a second reflected light beam exiting from the light-exiting surface in a direction perpendicular to the light-exiting surface and a third reflected light beam reflected onto the next adjacent transmissive grating.

A first planarization layer 03 covering the plurality of the transmissive gratings is arranged on the light-exiting surface of the light guide plate; a second planarization layer 04 covering the plurality of reflective gratings is arranged on a bottom surface of the light guide plate.

Specifically, in a case that the plurality of light-exiting regions include a first light-exiting region, a second light-exiting region, and a third light-exiting region arranged corresponding to the sub-pixel units of three colors, a first light-splitting grating is provided corresponding to the first light-exiting region, and the first light-splitting grating is arranged on a propagation path of first collimated light so that the first collimated light incident onto the first light-splitting grating exiting from the light-exiting surface in a collimated manner in a direction perpendicular to the light-exiting surface of the light guide plate 10; a second light-splitting grating is provided corresponding to the second light-exiting region, and the second light-splitting grating is arranged on a propagation path of second collimated light, so that the second collimated light incident onto the second light-splitting grating exiting from the light-exiting surface in a collimated manner in a direction perpendicular to the light-exiting surface of the light guide plate 10; and a third light-splitting grating is provided corresponding to the third light-exiting region, and the third light-splitting grating is arranged on a propagation path of third collimated light, so that the third collimated light incident onto the third light-splitting grating exiting from the light-exiting surface in a collimated manner in a direction perpendicular to the light-exiting surface of the light guide plate 10.

Figure 8:
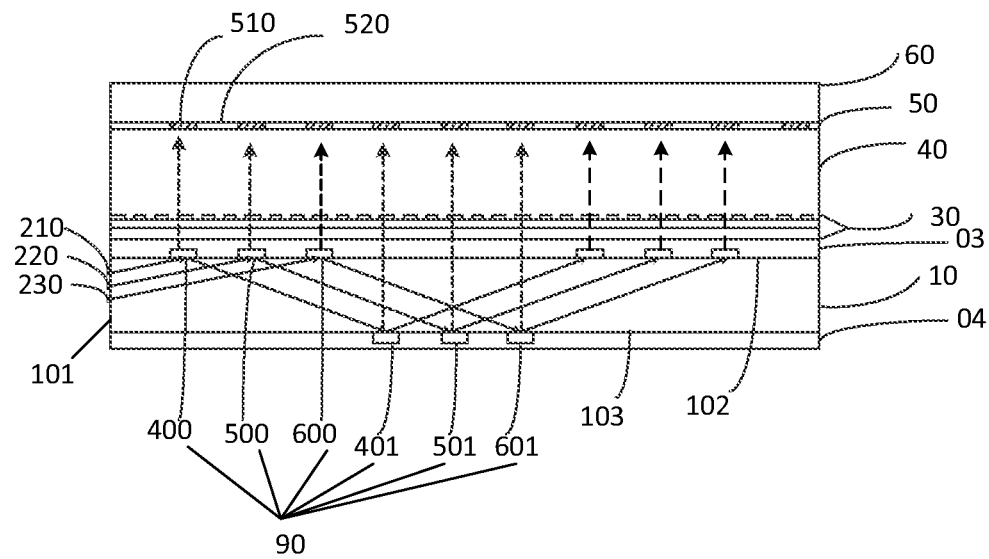
FIG. 8 is a third schematic structural diagram of a display device in some embodiments of the present disclosure.

Optionally, referring to FIG. 8, the light guide plate 1 includes a light-exiting surface 102 and a bottom surface 103 opposite to the light-exiting surface 102, and a first light-splitting grating includes: a plurality of first transmissive gratings 400 on the light-exiting surface and a plurality of first reflective gratings 401 on the bottom surface, the plurality of first transmissive gratings 400 and the plurality of first reflective gratings 401 are spaced apart from one another. That is, an orthographic projection of each of the plurality of first transmissive grating 400 on the bottom surface and an orthographic projection of each of the plurality of first reflective gratings 401 on the bottom surface are spaced apart from each other, and there is no overlapping region therebetween. First collimated light incident onto the first transmissive grating 400 is split by the first transmissive grating 400 to generate a first transmitted light beam exiting from the light-exiting surface 102 in a direction perpendicular to the light-exiting surface 102 and a first reflected light beam reflected onto the first reflective grating 401. The first reflected light beam incident onto the first reflective grating 401 is split by the first reflective grating 401 to generate a second reflected light beam exiting from the light-exiting surface 102 in a direction perpendicular to the light-exiting surface 102 and a third reflected light beam reflected onto the next first transmissive grating 400.

A second light-splitting grating includes a plurality of second transmissive gratings 500 on the light-exiting surface and a plurality of second reflective gratings 501 on the bottom surface. The plurality of second transmissive gratings 500 and the plurality of second reflective gratings 501 are spaced apart from one another. That is, an orthographic projection of each of the second transmissive gratings 500 on the bottom surface and an orthographic projection of the second reflective gratings 501 on the bottom surface are spaced apart from each other, there is no overlapping area therebetween. Second collimated light incident onto the second transmissive grating 500 is split by the second transmissive grating 500 to generate a second transmitted light beam exiting from the light-exiting surface 102 in a direction perpendicular to the light-exiting surface 102 and a fourth reflected light beam reflected onto the second reflective grating 501. The fourth reflected light beam incident onto the second reflective grating 501 is split by the second reflective grating 501 to generate a fifth reflected light beam exiting from the light-exiting surface 102 in a direction perpendicular to the light-exiting surface 102 and a sixth reflected light beam reflected onto the next second transmissive grating 400.

A third light-splitting grating includes a plurality of third transmissive gratings 600 on the light-exiting surface 102 and a plurality of third reflective gratings 601 on the bottom surface. The plurality of third transmissive gratings 600 and the plurality of third reflective gratings 601 are spaced apart from one another. That is, an orthographic projection of each of the third transmissive gratings 600 on the bottom surface and an orthographic projection of the third reflective gratings 601 on the bottom surface are spaced apart from each other, and there is no overlapping area therebetween. Third collimated light incident onto the third transmissive grating 600 is split by the third transmissive grating 600 to generate a third transmitted light beam exiting from the light-exiting surface 102 in a direction perpendicular to the light-exiting surface 102 and a seventh reflected light beam reflected onto the third reflective grating 601. The seventh reflected light beam incident onto the third reflective grating 601 is split by the third reflective grating 601 to generate an eighth reflected light beam exiting from the light-exiting surface 102 in a direction perpendicular to the light-exiting surface 102 and a ninth reflected light beam reflected onto the next third transmissive grating 600.

In the embodiments of the present disclosure, a period P of each grating of the first light-splitting grating, the second light-splitting grating, and the third light-splitting grating can be obtained according to a following formula:

$n_1 \sin\theta_1 - n_2 \sin\theta_2 = m\lambda/P$, where $n_1$ is a refractive index of a medium in which incident light is located, $n_2$ is a refractive index of a medium in which diffracted light is located, $\theta_1$ is an incident angle of a beam, $\theta_2$ is a diffraction angle of a beam (in the embodiments of the present disclosure, transmitted light from the first light-splitting grating, the second light-splitting grating, and the third light-splitting grating is emitted upwardly in a collimated manner, and accordingly $\theta_2=0$), $\lambda$ is a wavelength of light to be selected; m is diffraction order of light (m=1 or −1 in some embodiments of the present disclosure).

A height and a line width of the transmissive grating and a height and a line width of the reflective grating in the first light-splitting grating, the second light-splitting grating and the third light-splitting grating affect a diffraction efficiency of the gratings, and can be determined from to specific structure requirement and an optimized design based on an optical simulation software.

Embodiments of the present disclosure also provide a display device. The display device includes the optical substrate 1 and a light-emitting unit 2. The light-emitting unit 2 is configured to emit a collimated light beam, and cause the collimated light beam to be incident into the light guide plate from the light-incident surface of the light guide plate at a preset angle.

In order to facilitate controlling a propagation path of the light beam emitted from the light-emitting unit 2, in some embodiments of the present disclosure, the light-emitting unit 2 includes a collimated-light source 20. The collimated-light source includes a light source 201 on a side outside the light-incident surface of the light guide plate, configured to emit white light or three-color-mixed light; and a collimating lens structure 202 configured to collimate the light emitted from the light source 201 so as to form a collimated light beam incident into the light guide plate 10 at the preset angle.

Light selected by a light selection unit exits from a light-exiting region corresponding to the light selection unit. In order to prevent leakage of light, a width of a light beam exiting from a light-exiting region is smaller than or equal to a width of the light-exiting region. Directed to this requirement, the light-emitting unit 2 in some embodiments of the present disclosure further includes a beam-reduction structure 70 configured to narrow the width of a collimated-light beam emitted from the collimating lens structure.

There may be various specific structural forms of the beam-reduction structure. The following several examples are provided in some embodiments of the present disclosure.

Figure 4:
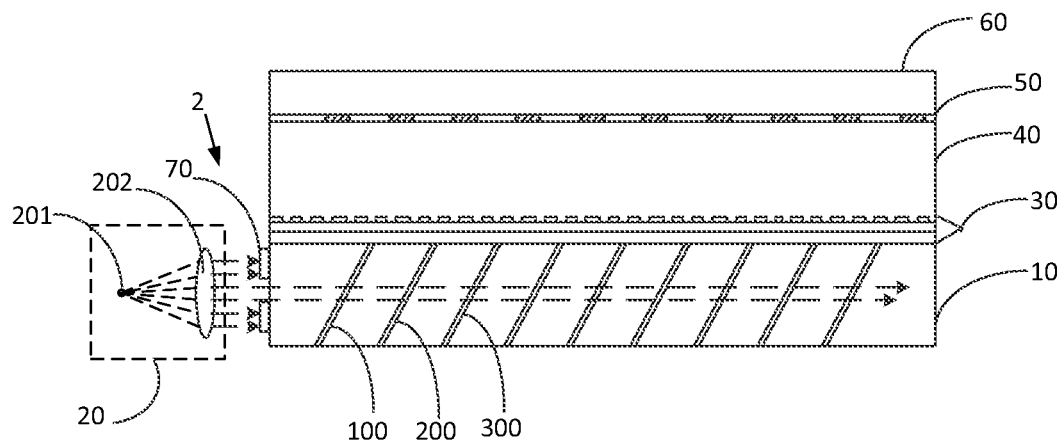
FIG. 4 is a first schematic structural diagram of a display device in some embodiments of the present disclosure.

In one example, as shown in FIG. 4, the beam-reduction structure 70 includes a light-shielding member disposed on the light-incident surface of the light guide plate, and an opening having a preset area is disposed on the light-shielding member, so that the width of the light beam incident into the light guide plate 10 is not greater than (i.e., less than or equal to) the width of a corresponding light-exiting region.

Figure 5:
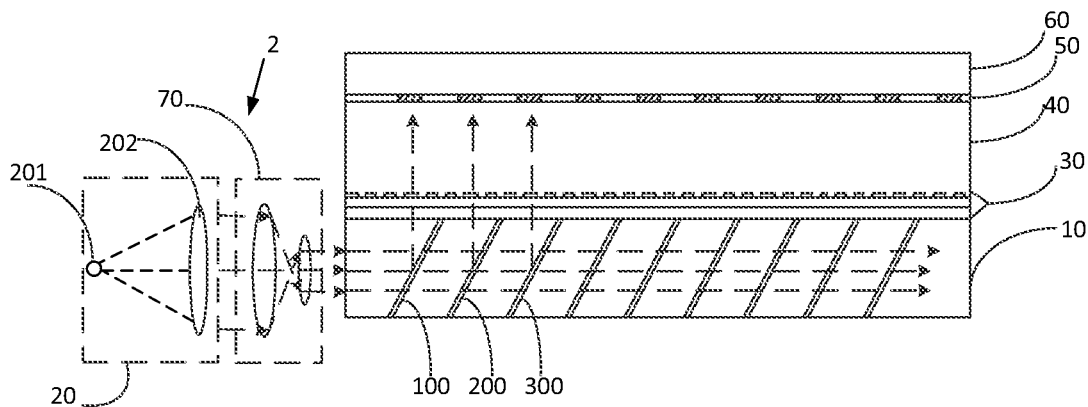
FIG. 5 is a second schematic structural diagram of a display device in some embodiments of the present disclosure.

In another example, as shown in FIG. 5, the beam-reduction structure 70 includes two lenses having different focal lengths, and main optical axes of the two lenses coincide, wherein the two lenses include a first convex lens 71 and a second convex lens 72 disposed in a propagation direction of a light beam emitted from the light-emitting unit. A focal point of the first convex lens 71 on a side closer to the second convex lens 72 coincides with a focal point of the second convex lens 72 on a side closer to the first convex lens 71 at a first position, and the focal length f1 of the first convex lens 71 is larger than the focal length f2 of the second convex lens 72, and a first collimated light beam emitted from the collimating lens structure enters the first convex lens 71 in a direction parallel to the main optical axis of the first convex lens 71 and is refracted by the first convex lens 71. A light beam generated after the refracting passes through the first position and is refracted by the second convex lens 72. A light beam generated after the refracting is a second collimated light beam propagating in a direction parallel to the main optical axis of the second convex lens 72, and a width d2 of the second collimated light beam is smaller than a width d1 of the first collimated light beam, as shown in FIG. 6.

Figure 6:
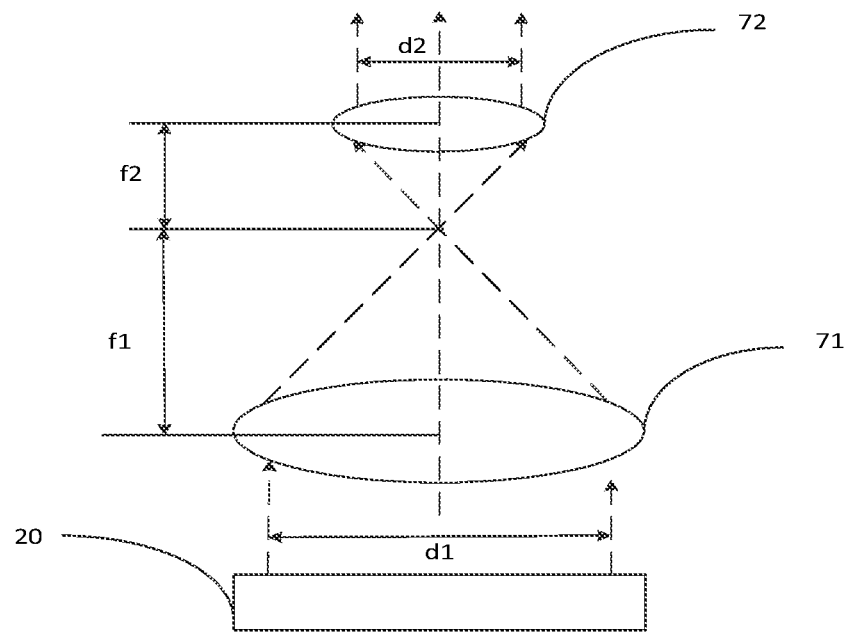
FIG. 6 is a first schematic diagram of a beam contraction structure in some embodiments of the present disclosure.

As shown in FIG. 6, the first convex lens is a long focal-length lens having a large aperture, the second convex lens is a short focal-length lens having a small aperture, the collimated-light source is located at a focus position of the long focal-length lens having the large aperture, and a final beam-reduction ratio is:

$$d1/d2 = f1/f2, \text{ where,}$$

d1: a beam width of a beam incident on a beam-reduction system d2: a beam width of a beam exiting from the beam-reduction system f1: a focal length of the first convex lens f2: a focal length of the second convex lens.

Figure 7:
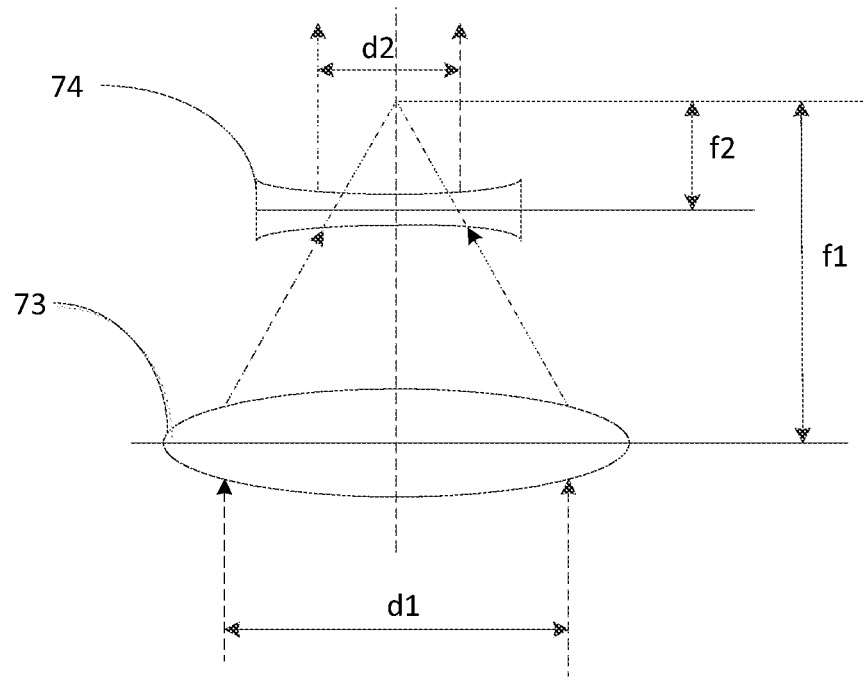
FIG. 7 is a second schematic diagram of a beam contraction structure in some embodiments of the present disclosure.

In yet another example, the beam-reduction structure 70 includes two lenses having different focal lengths, and main optical axes of the two lenses coincide, wherein the two lenses include a third convex lens 73 and a first concave lens 74 concave at both sides of the first concave lens 74; the third convex lens 73 and the first concave lens 74 are disposed along a propagation direction of a light beam emitted from the light-emitting unit; a focus on a side of the third convex lens 73 near the first concave lens 74 and a focus on a side of the first concave lens 74 away from the third convex lens 73 coincide at a second position; a focal length f1 of the third convex lens 73 is larger than a focal length f2 of the first concave lens 74, and a first collimated-light beam emitted from the collimating lens structure enters the third convex lens 73 in a direction parallel to the main optical axis of the third convex lens 73, and then propagates to the first concave lens 74 after being refracted by the third convex lens 73, and then forms a second collimated-light beam propagating in a direction parallel to the main optical axis of the first concave lens 74 after being refracted by the first concave lens 74, wherein a width of the second collimated-light beam d2 is smaller than a width of the first collimated-light beam d1, as shown in FIG. 7.

In some optional embodiments of the present disclosure, the light-emitting unit 2 includes a light source. The light source includes at least two light sub-sources spaced from one another, each of the light sub-sources emits monochromatic light having a preset color, the at least two light sub-sources are spaced from one another along a first direction on a side of the light-incident surface 101 of the light guide plate such that monochromatic light rays emitted by each of the at least two light sub-sources are incident into the light guide plate 10 at the preset angle in parallel and propagate within the light guide plate 10 in a non-total reflection manner. The first direction is a direction perpendicular to both the light-exiting surface 102 of the light guide plate 10 and the bottom surface 103 opposite to the light-exiting surface 102 of the light guide plate 10, i.e., from the light-exiting surface 102 to the bottom surface 103.

In an embodiment, the at least two light sub-sources include a first collimating light sub-source 210 for emitting a first collimated light beam having a wavelength in a first range; a second collimating light sub-source 220 for emitting second collimated light beam having a wavelength in a second range; and a third collimating light sub-source 230 for emitting a third collimated beam light having a wavelength in a third range.

The first collimating light sub-source 210, the second collimating light sub-source 220, and the third collimating light sub-source 230 are spaced from one another along the first direction on the light-incident side of the light guide plate 10 such that the first collimated light beam, the second collimated light beam and the third collimated light beam are incident onto the light guide plate 10 in parallel at a second preset angle, and propagate in the light guide plate 10 in a non-total reflection manner.

In the embodiment, each of a width of the first collimated light beam, a width of the second collimated light beam, and a width of the third collimated light is smaller than a first width so that the first collimated light beam, the second collimated light beam, and the third collimated light beam do not overlap with each other in propagation paths thereof, thereby avoid color-mixing. The first width may be less than or equal to a line width of the transmissive grating or the reflective grating in the light-splitting grating.

Referring to FIG. 8, in some embodiments of the present disclosure, the display device further includes a grayscale control unit 5. The grayscale control unit 5 includes an opposite substrate 60 disposed opposite to the light guide plate; a liquid crystal layer 40 disposed between the light guide plate 10 and the opposite substrate 60; a light shielding layer 50 between the opposite substrate 60 and the liquid crystal layer 40, wherein the light shielding layer 50 includes a plurality of opening regions 520, an orthographic projection of each of the opening regions 520 on the light guide plate 10 is between any two adjacent light-exiting regions among the plurality of light-exiting regions; electrodes 30 (such as a common electrode and a pixel electrode, or a plurality of electrodes) for supplying an electric field to the liquid crystal layer 40, wherein the electrode 30 is provided on a side, where the light-exiting surface is, of the light guide plate 10, and is used for adjusting a rotation angle of liquid crystal, thereby adjusting a propagation direction of monochromatic light incident on the liquid crystal layer; wherein in a case that a voltage of the electrode 30 is 0 and no electric field is supplied to the liquid crystal layer 40, light exiting from the optical substrate 1 is incident onto the light shielding layer 50 and is absorbed by the light shielding layer 50, thereby implementing a dark display state; in a case that the voltage supplied by the electrode 30 to the liquid crystal layer 40 is not zero, the liquid crystal is rotated to form a liquid crystal grating, and the light exiting from the optical substrate passes through the liquid crystal grating and is emitted from the plurality of opening regions, thereby implementing a bright display state.

In the embodiments of the present disclosure, the opposite substrate 60 is a glass substrate which requires high transparency, avoids light loss, and has good surface flatness.

In embodiments of the present disclosure, the light shielding layer 50 may be a black-matrix light-absorbing material located at a side, where a color film substrate is, of a TFT-LCD (Thin Film Transistor-Liquid Crystal Display).

Figure 2:
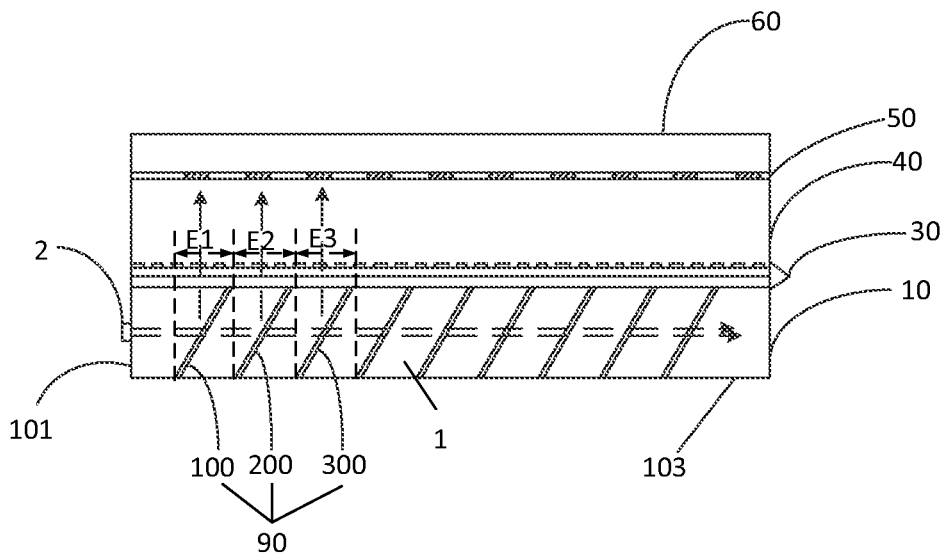
FIG. 2 is a first schematic structural diagram of an optical substrate in some embodiments of the present disclosure.
Figure 3:
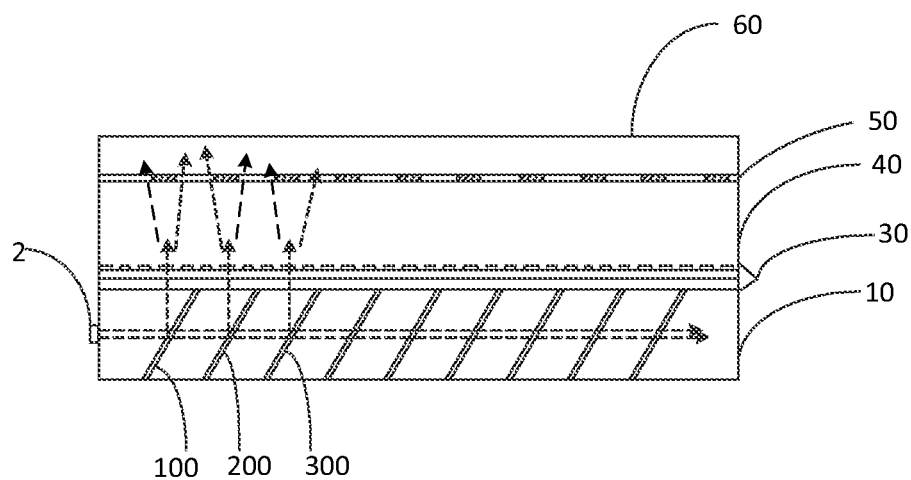
FIG. 3 is a second schematic structural diagram of an optical substrate in some embodiments of the present disclosure.

The light shielding layer 50 includes the light shielding regions 510 and the opening regions 520 arranged in matrix and alternately. FIG. 3 shows a schematic diagram of light emission in the bright display state; it should be understood that FIG. 3 is a schematic diagram only, and light rays emitted from adjacent sub-pixels do not intersect so as to avoid color-mixing. FIG. 2 is a schematic diagram of light emission in the dark display state. In the dark display state, the liquid crystal layer does not implement a function of the liquid crystal layer, and light emitted from the light selection unit directly enters the light shielding regions 510, and is absorbed by the light shielding regions 510; in the bright display state, the liquid crystal is rotated by an electric field, and the light emitted from the light selection unit is deviated by the liquid crystal layer, and exits from the opening regions 520.

In some embodiments of the present disclosure, the electrode 30 includes a slit electrode 30 and a plate electrode 30 distributed in an Advanced Super-Dimensional Field mode.

The slit electrode 30 and the plate electrode 30 may be located on the same side of the liquid crystal layer or on both sides of the liquid crystal layer.

The display device may be any product or component having a display function such as an Liquid Crystal Display (LCD) TV, a Liquid Crystal Display, a digital photo frame, a mobile phone, a tablet computer, and the like, wherein the display device further includes a flexible circuit board, a printed circuit board and a back plate. In the future Augmented Reality (AR)/Virtual Reality (VR) and other fields have a commercial value.

The advantageous effect of the present disclosure is that a color backlight effect is realized, and a colorful display is realized without providing a color film structure, and an utilization efficiency of light is improved.

What is described above are optional embodiments of the present disclosure. It should be noted that several improvements and embellishments may also be made by those of ordinary skill in the art without departing from the principle of the present disclosure, and these improvements and embellishments should also be considered to be within the protection scope of the present disclosure.

The invention claimed is:

1. An optical substrate, comprising:
   a light guide plate and a plurality of light selection units,
   wherein, the light guide plate comprises a light-incident surface and a light-exiting surface, and the light-exiting surface comprises a plurality of light-exiting regions;
   each light selection unit of the plurality of light selection unit is configured to select light incident from the light-incident surface and propagating in the light guide plate, such that monochromatic light of different colors are emitted from multiple light-exiting regions corresponding to the each light selection unit, and each of the multiple light-exiting regions emits monochromatic light of a single color, wherein the each light selection unit comprises multiple light-filtering films, the multiple light-filtering films correspond in a one-to-one manner to the multiple light-exiting regions corresponding to the each light selection unit, and each of the multiple light-filtering films is configured to reflect monochromatic light of a preset color among monochromatic light of the different colors to exit from the light-exiting surface and is configured to transmit monochromatic light of a color other than the preset color among monochromatic light of the different colors, wherein the plurality of light-filtering films comprises a first light-filtering film, a second light-filtering film, and a third light-filtering film;

the first light-filtering film, the second light-filtering film and the third light-filtering film are arranged in the light guide plate at equal intervals with respect to the light-exiting surface;

an included angle between the first light-filtering film and the light-exiting surface, an included angle between the second light-filtering film and the light-exiting surface, and an included angle between the third light-filtering film and the light-exiting surface are a first angle, a second angle and a third angle, respectively, wherein each of the plurality of light-filtering films is formed by periodically and alternately laminating dielectric layers of at least two different refractive indices, wherein an arrangement period d of the dielectric layers of at least two different refractive indices forming the light-filtering film satisfies a following formula:

$d=\lambda/2*n*\sin(\pi/2-\theta)$, where, $\lambda$ is a wavelength of monochromatic light reflected by the light-filtering film, n is an average refractive index of dielectric layers of at least two different refractive indices forming the light-filtering film, and $\theta$ is an included angle between an incident light ray incident onto the light-filtering film and a normal line of the light-filtering film.

2. The optical substrate according to claim 1, wherein the first light-filtering film, the second light-filtering film, and the third light-filtering film are arranged in parallel; the first angle, the second angle, and the third angle are 45 degrees.

3. The optical substrate according to claim 1, wherein the dielectric layers of at least two different refractive indices comprise a high-refractive-index dielectric layer and a low-refractive-index dielectric layer, wherein a refractive index of the high-refractive-index dielectric layer is 1.51, and a refractive index of the low-refractive-index dielectric layer is 1.49.

4. The optical substrate according to claim 1, wherein the plurality of light selection units comprises a plurality of light-splitting gratings, the plurality of light-splitting gratings correspond in one-to-one manner to the plurality of light-exiting regions, and each of the plurality of light-splitting gratings is on a propagation path of light incident from the light-incident surface and is configured to cause monochromatic light of a preset color in light incident onto the light-splitting grating to exit toward the light-exiting surface.

5. The optical substrate according to claim 4, wherein the light guide plate comprises a bottom surface opposite to the light-exiting surface, the plurality of light-splitting gratings comprises a plurality of transmissive gratings on the light-exiting surface and a plurality of reflective gratings on the bottom surface, each transmissive grating of the plurality of transmissive gratings is disposed corresponding to a light-exiting region of the plurality of light-exiting regions, each reflective grating of the plurality of reflective gratings is disposed corresponding to a light-exiting region of the plurality of light-exiting regions, and the plurality of transmissive gratings and the plurality of reflective gratings are arranged alternately;

light incident onto a transmissive grating of the plurality of transmissive grating is split by the transmissive grating to generate a first transmitted light beam exiting from the light-exiting surface in a direction perpendicular to the light-exiting surface and a first reflected light beam reflected onto a reflective grating of the plurality of reflective grating; the first reflected light beam incident onto the reflective grating is split by the reflective grating to generate a second reflected light beam exiting from the light-exiting surface in a direction perpendicular to the light-exiting surface and a third reflected light beam reflected onto a next adjacent transmissive grating.

6. The optical substrate according to claim 5, wherein a first planarization layer covering the plurality of the transmissive gratings is arranged on a light-exiting surface of the light guide plate;

a second planarization layer covering the plurality of reflective gratings is arranged on the bottom surface of the light guide plate.

7. The optical substrate according to claim 5, wherein the plurality of light-splitting gratings comprises a first light-splitting grating, a second light-splitting grating and a third light-splitting grating; a period P of each grating of the first light-splitting grating, the second light-splitting grating, and the third light-splitting grating is obtained according to a following formula:

$n_1 \sin\theta_1 - n_2 \sin\theta_2 = m\lambda/P$, where $n_1$ is a refractive index of a medium in which an incident light beam is located, $n_2$ is a refractive index of a medium in which a diffracted light beam is located, $\theta_1$ is an incident angle of a beam, $\theta_2$ is a diffraction angle of a beam, $\lambda$ is a wavelength of light to be selected, m is diffraction order of light.

8. The optical substrate according to claim 1, further comprising:

a light-emitting unit at the light-incident surface of the light guide plate, configured to emit a collimated light beam and cause the collimated light beam to be incident into the light guide plate from the light-incident surface of the light guide plate at a preset angle;

wherein the light-emitting unit comprises:

a light source on a side of the light-incident surface of the light guide plate, configured to emit white light or three-color-mixed light;

a collimating lens structure configured to collimate the light emitted from the light source so as to form a collimated light beam incident into the light guide plate at the preset angle; and a beam-reduction structure configured to narrow a width of the collimated light beam emitted from the collimating lens structure.

9. The optical substrate according to claim 8, wherein the beam-reduction structure comprises a light-shielding member arranged on the light-incident surface of the light guide plate, and an opening having a preset area is arranged on the light-shielding member, so that a width of a light beam incident into the light guide plate is less than or equal to a width of a corresponding light-exiting region of the plurality of light-exiting regions.

10. The optical substrate according to claim 8, wherein the beam-reduction structure comprises two lenses having different focal lengths, and main optical axes of the two lenses coincide;

the two lenses comprise a first convex lens and a second convex lens arranged in a propagation direction of a light beam emitted from the light-emitting unit; a focal point of the first convex lens on a side, closer to the second convex lens, of the first convex lens coincides with a focal point of the second convex lens on a side, closer to the first convex lens, of the second convex lens at a first position; a focal length of the first convex lens is larger than a focal length of the second convex lens; and a first collimated light beam emitted from the collimating lens structure enters the first convex lens in a direction parallel to the main optical axis of the first convex lens and passes through the first position after being refracted by the first convex lens, the light beam passing through the first position is refracted by the second convex lens to generate a second collimated light beam propagating in a direction parallel to the main optical axis of the second convex lens; and a width of the second collimated light beam is smaller than a width of the first collimated light beam;

or, the two lenses comprise a third convex lens and a first concave lens concave at both sides of the first concave lens; the third convex lens and the first concave lens are arranged along a propagation direction of a light beam emitted from the light-emitting unit; a focus of the third convex lens on a side of the third convex lens near the first concave lens and a focus of the first concave lens on a side of the first concave lens away from the third convex lens coincide at a second position; a focal length of the third convex lens is larger than a focal length of the first concave lens, and a first collimated-light beam emitted from the collimating lens structure enters the third convex lens in a direction parallel to a main optical axis of the third convex lens, and then propagates to the first concave lens after being refracted by the third convex lens, and then forms a second collimated-light beam propagating in a direction parallel to a main optical axis of the first concave lens after being refracted by the first concave lens, wherein a width of the second collimated-light beam is smaller than a width of the first collimated-light beam.

11. The optical substrate according to claim 8, wherein the light-emitting unit comprises a light source, the light source comprises at least two light sub-sources spaced from one another, each of the at least two light sub-sources emits monochromatic light of a preset color, the at least two light sub-sources are spaced from one another along a first direction on a side of the light-incident surface of the light guide plate such that monochromatic light rays emitted by each of the at least two light sub-sources are incident into the light guide plate at a preset angle in parallel and propagate within the light guide plate in a non-total reflection manner, the first direction is a direction from the light-exiting surface of the light guide plate to a bottom surface of the light guide plate opposite to the light-exiting surface.

12. The optical substrate according to claim 11, wherein the at least two light sub-sources comprise a first collimating light sub-source, a second collimating light sub-source, and a third collimating light sub-source, the first collimating light sub-source, the second collimating light sub-source, and the third collimating light sub-source are configured to emit first collimated light, second collimated light and third collimated light, respectively, and the first collimated light, the second collimated light and the third collimated light are incident into the light guide plate in parallel at a second preset angle and propagate in the light guide plate in a non-total reflection manner.

13. The optical substrate according to claim 10, wherein widths of monochromatic light beams emitted by the at least two light sub-sources are smaller than a preset width, such that the monochromatic light beams emitted by the at least two light sub-sources do not overlap in propagation paths of the monochromatic light beams.

14. A display device, comprising:

an optical substrate; and an opposing substrate opposite to the optical substrate, wherein the optical substrate comprises a light guide plate and a plurality of light selection units, the light guide plate comprises a light-incident surface and a light-exiting surface, and the light-exiting surface comprises a plurality of light-exiting regions; each light selection unit of the plurality of light selection unit is configured to select light incident from the light-incident surface and propagating in the light guide plate, such that monochromatic light of different colors are emitted from multiple light-exiting regions corresponding to the each light selection unit, and each of the multiple light-exiting regions emits monochromatic light of a single color, wherein the each light selection unit comprises multiple light-filtering films, the multiple light-filtering films correspond in a one-to-one manner to the multiple light-exiting regions corresponding to the each light selection unit, and each of the multiple light-filtering films is configured to reflect monochromatic light of a preset color among monochromatic light of the different colors to exit from the light-exiting surface and is configured to transmit monochromatic light of a color other than the preset color among monochromatic light of the different colors, wherein the plurality of light-filtering films comprises a first light-filtering film, a second light-filtering film, and a third light-filtering film;

the first light-filtering film, the second light-filtering film and the third light-filtering film are arranged in the light guide plate at equal intervals with respect to the light-exiting surface;

an included angle between the first light-filtering film and the light-exiting surface, an included angle between the second light-filtering film and the light-exiting surface, and an included angle between the third light-filtering film and the light-exiting surface are a first angle, a second angle and a third angle, respectively, wherein each of the plurality of light-filtering films is formed by periodically and alternately laminating dielectric layers of at least two different refractive indices, wherein an arrangement period d of the dielectric layers of at least two different refractive indices forming the light-filtering film satisfies a following formula:

$d=\lambda/2*n*\sin(\pi/2-\theta)$, where, $\lambda$ is a wavelength of monochromatic light reflected by the light-filtering film, n is an average refractive index of dielectric layers of at least two different refractive indices forming the light-filtering film, and $\theta$ is an included angle between an incident light ray incident onto the light-filtering film and a normal line of the light-filtering film.

15. The display device according to claim 14, further comprising:
    a liquid crystal layer between the light guide plate and the opposite substrate;
    a light shielding layer between the opposite substrate and the liquid crystal layer, wherein the light shielding layer comprises a plurality of opening regions, an orthographic projection of each of the plurality of opening regions on the optical substrate is between any two adjacent light-exiting regions among the plurality of light-exiting regions;
    an electrode for supplying an electric field to the liquid crystal layer, wherein the electrode is provided on a side, where the light-exiting surface is, of the light guide plate, and is configured for adjusting a rotation angle of liquid crystal, so as to adjust a propagation direction of monochromatic light incident on the liquid crystal layer.

16. The display device according to claim 15, wherein the light shielding layer comprises a plurality of light shielding regions and a plurality of opening regions arranged alternately.

17. An optical substrate, comprising:
    a light guide plate and a plurality of light selection units,
    wherein, the light guide plate comprises a light-incident surface and a light-exiting surface, and the light-exiting surface comprises a plurality of light-exiting regions;
    each light selection unit of the plurality of light selection unit is configured to select light incident from the light-incident surface and propagating in the light guide plate, such that monochromatic light of different colors are emitted from multiple light-exiting regions corresponding to the each light selection unit, and each of the multiple light-exiting regions emits monochromatic light of a single color,
    wherein the plurality of light selection units comprises a plurality of light-splitting gratings, the plurality of light-splitting gratings correspond in one-to-one manner to the plurality of light-exiting regions, and each of the plurality of light-splitting gratings is on a propagation path of light incident from the light-incident surface and is configured to cause monochromatic light of a preset color in light incident onto the light-splitting grating to exit toward the light-exiting surface,
    wherein the light guide plate comprises a bottom surface opposite to the light-exiting surface, the plurality of light-splitting gratings comprises a plurality of transmissive gratings on the light-exiting surface and a plurality of reflective gratings on the bottom surface, each transmissive grating of the plurality of transmissive gratings is disposed corresponding to a light-exiting region of the plurality of light-exiting regions, each reflective grating of the plurality of reflective gratings is disposed corresponding to a light-exiting region of the plurality of light-exiting regions, and the plurality of transmissive gratings and the plurality of reflective gratings are arranged alternately;
    light incident onto a transmissive grating of the plurality of transmissive grating is split by the transmissive grating to generate a first transmitted light beam exiting from the light-exiting surface in a direction perpendicular to the light-exiting surface and a first reflected light beam reflected onto a reflective grating of the plurality of reflective grating; the first reflected light beam incident onto the reflective grating is split by the reflective grating to generate a second reflected light beam exiting from the light-exiting surface in a direction perpendicular to the light-exiting surface and a third reflected light beam reflected onto a next adjacent transmissive grating.

18. The optical substrate according to claim 17, wherein a first planarization layer covering the plurality of the transmissive gratings is arranged on a light-exiting surface of the light guide plate;
    a second planarization layer covering the plurality of reflective gratings is arranged on the bottom surface of the light guide plate.

19. The optical substrate according to claim 17, wherein the plurality of light-splitting gratings comprises a first light-splitting grating, a second light-splitting grating and a third light-splitting grating; a period P of each grating of the first light-splitting grating, the second light-splitting grating, and the third light-splitting grating is obtained according to a following formula:

$n1 \sin \theta_1 - n2 \sin \theta_2 = m\lambda/P$, where n1 is a refractive index of a medium in which an incident light beam is located, n2 is a refractive index of a medium in which a diffracted light beam is located, $\theta_1$ is an incident angle of a beam, $\theta_2$ is a diffraction angle of a beam, $\lambda$ is a wavelength of light to be selected, m is diffraction order of light.

* * * * *